United States Patent

Short et al.

Patent Number: 5,368,792
Date of Patent: Nov. 29, 1994

[54] METHOD FOR MOLDING THREADS IN GRAPHITE PANELS

[75] Inventors: William W. Short, Livermore, Calif.; Cecil Spencer, Silverton, Oreg.

[73] Assignee: The United States of America as represented by the United States Department of Energy, Washington, D.C.

[21] Appl. No.: 106,679

[22] Filed: Aug. 16, 1993

[51] Int. Cl.⁵ ............ B28B 1/48; B28B 7/36; B29D 1/00; B32B 35/00

[52] U.S. Cl. .................... 264/36; 156/92; 156/98; 264/69; 264/155; 264/264; 264/267; 264/318; 264/338

[58] Field of Search ........... 264/36, 155, 138, 312, 264/318, 264, 267, 338, 69; 156/92, 98, 94

[56] References Cited

U.S. PATENT DOCUMENTS

| | | | |
|---|---|---|---|
| 1,883,196 | 10/1932 | Wertz | 264/36 |
| 2,663,662 | 12/1953 | Graf et al. | 156/92 X |
| 2,690,879 | 10/1954 | Snyder | 156/92 X |
| 3,492,381 | 1/1970 | Rhyne | 264/36 |
| 3,711,347 | 1/1973 | Wagner et al. | 156/92 X |
| 3,716,608 | 2/1973 | Neumann | 264/36 |
| 3,723,215 | 3/1973 | Kessler | 156/92 |
| 3,844,863 | 10/1974 | Forsythe et al. | 156/98 |
| 4,100,954 | 7/1978 | Müller et al. | 156/92 X |
| 4,354,332 | 10/1982 | Lentz | 264/36 X |
| 4,759,888 | 7/1988 | Brest van Kempen | 264/35 X |
| 4,929,505 | 5/1990 | Washburn et al. | 156/92 X |
| 5,152,948 | 10/1992 | Lizenby | 264/264 X |
| 5,190,611 | 3/1993 | Cologna et al. | 156/98 |
| 5,221,542 | 6/1993 | Coetzer | 264/318 X |

*Primary Examiner*—Karen Aftergut
*Attorney, Agent, or Firm*—Miguel A. Valdes; Roger S. Gaither; William R. Moser

[57] ABSTRACT

A graphite panel (10) with a hole (11) having a damaged thread (12) is repaired by drilling the hole (11) to remove all of the thread and make a new hole (13) of larger diameter. A bolt (14) with a lubricated thread (17) is placed in the new hole (13) and the hole (13) is packed with graphite cement (16) to fill the hole and the thread on the bolt. The graphite cement (16) is cured, and the bolt is unscrewed therefrom to leave a thread (20) in the cement (16) which is at least as strong as that of the original thread (12).

4 Claims, 1 Drawing Sheet

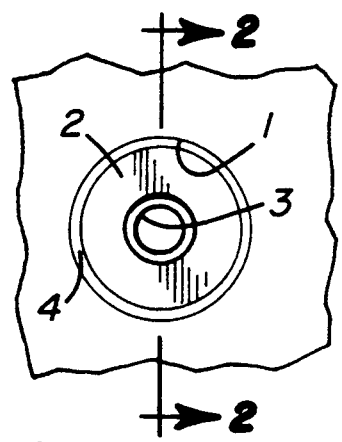
FIGURE 1
(PRIOR ART)
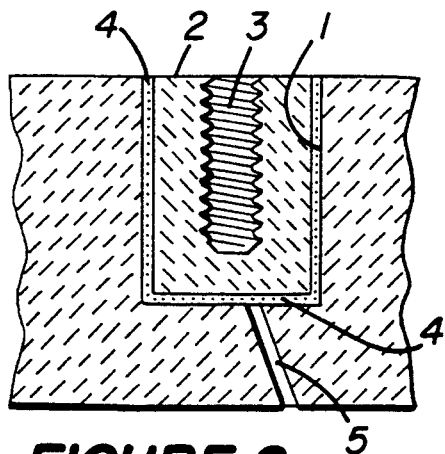
FIGURE 2
(PRIOR ART)
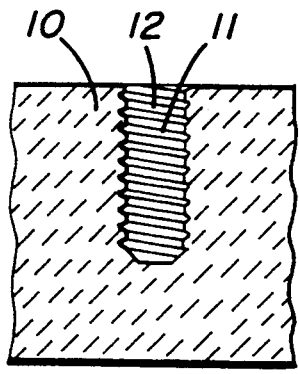
FIGURE 3
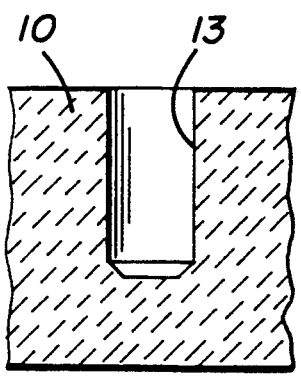
FIGURE 4
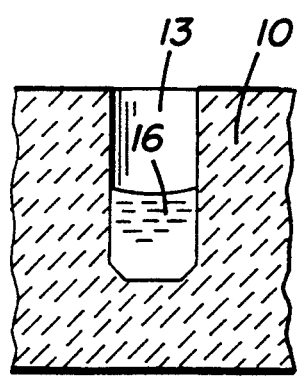
FIGURE 5
FIGURE 6
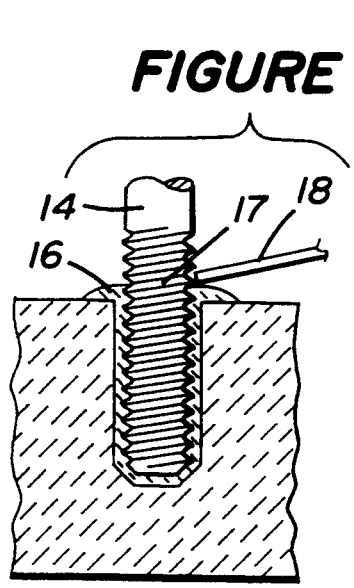
FIGURE 7
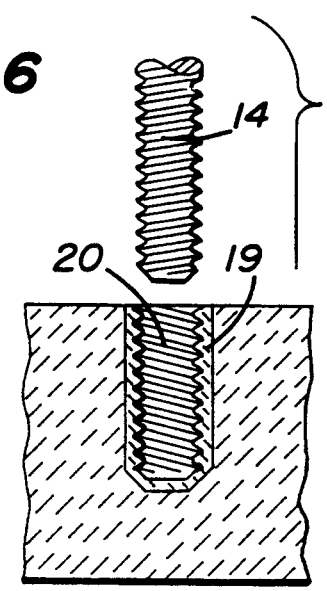
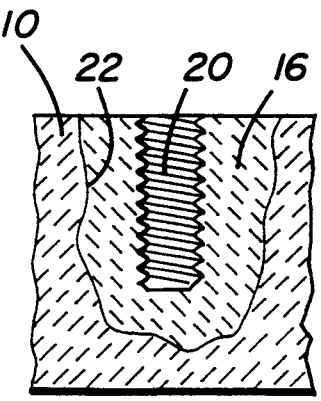
FIGURE 8

METHOD FOR MOLDING THREADS IN GRAPHITE PANELS

The Government has rights in this invention pursuant to Contract No. W-704-ENG-48 between the U.S. Department of Energy and the University of California.

BACKGROUND OF THE INVENTION

This invention relates to the formation of threaded holes in graphite panels and in particular to the repair of damaged threads in such panels.

A method presently in use to separate metal isotopes is the atomic vapor laser isotope separation (AVLIS) process wherein a beam of neutral metal atoms is irradiated by tunable lasers to ionize atoms of a desired isotope of the metal. In general, an AVLIS process is carried out in a vacuum chamber, with the metal (such as uranium) to be processed being put into an open crucible and heated from above by an electron beam sufficient to generate a substantial vapor pressure of the material from the surface of the electron-beam-heated melt. The gas-phase atoms are mostly in the lowest-lying electronic states and when irradiated by tunable lasers of the proper wavelength the atoms of the desired isotope of the metal will ionize. The ionized atoms are attracted to an electrically charged extractor while the beam of remaining neutral atoms in the gas phase continues unimpeded in its flow until it condenses and collects on a collector plate.

Many of the components in the AVLIS process are graphite panels and other shapes made of Stackpole 20—20, a high purity graphite, the panels being held in place by bolts that screw into threaded holes formed directly into the graphite. Periodically, the panels must be disassembled for inspection, for removal of the metal film resulting from the condensation of the hot gases on the panels, and for other normal maintenance. Such disassembly often causes damage to the threaded holes in the panels.

Previously, if the damage to the threads was enough so that bolts would not hold upon reassembly, the panels would be discarded. This is very costly since the panels are custom-made and come in various sizes and shapes, costing several thousands of dollars apiece. Because of the cost, replacement panels would not be kept in stock and several weeks would be required to fabricate a new panel.

Attempts have been made to repair such damaged threads in graphite panels by substantially enlarging the diameter of the hole and gluing a metal nut in the hole, the nut having a hole therethrough with threads of the desired pitch and diameter. This attempt proved unsatisfactory because the metal bolt and nut would freeze together when subsequently subjected to the high temperature (e.g., 1200° C.) of an AVLIS process. Lubricants are available to prevent such freezing, but would be detrimental to the process in that the lubricants would evaporate into the vacuum environment and condense on the surfaces of the panels.

Another repair attempt is that shown in FIGS. 1 and 2 herein. In this case, the region of the panel surrounding the damaged threaded hole was drilled or reamed out to form a pocket 1 having a diameter slightly more than twice that of the damaged hole. A circular graphite plug 2 having an outside diameter twice that of the drilled and tapped hole 3 therein was inserted into pocket 1 and held in place by a suitable epoxy glue 4.

This attempt was more successful than the previous attempt. However, it was found that there were failures resulting from rapid changes in operating temperature and poor heat transfer through the glue. Also, because of the configurations of the panels, there were places where it was not possible to put a replacement plug.

Another problem with the plug attempt is that air will often be trapped between the plug and the panel. Later, when the panel is reassembled and in the vacuum environment of the AVLIS process, the trapped air will leak out, making it harder to pull the necessary vacuum in the process. In an effort to eliminate this problem, a relief passage 5 has been drilled into the bottom of pocket 1. This procedure increased the cost of repair and, again, could not be used in many locations of the panels.

SUMMARY OF THE INVENTION

It is the principal object of the invention to provide a method for repairing damaged threaded holes in graphite panels that is inexpensive and will produce a new thread having substantially the same thread strength and thermal characteristics of the original threaded hole and which will not adversely affect a vacuum environment of use.

Additional objects, advantages and novel features will be set forth in the description which follows, and in part will become apparent to those skilled in the art upon examination of the following, or may be learned by practice of the invention. The objects and advantages of the invention may be realized and attained by means of instrumentalities and combinations pointed out in the appended claims.

To achieve the foregoing and other objects, and in accordance with the present invention as described and broadly claimed herein, a hole is formed into a graphite panel, the hole having a diameter greater than that of the desired thread to be formed, a bolt is inserted in the hole, the bolt having a lubricated thread of the desired diameter, shape and pitch, graphite cement is packed into the hole to completely fill the thread of the bolt, the graphite cement is cured, and the lubricated bolt is unscrewed from the cement.

BRIEF DESCRIPTION OF THE DRAWINGS

The accompanying drawings, which are incorporated in and form part of the application, together with the description, serve to explain the principles of the invention.

FIG. 1 is a plan view of a prior art attempt to repair a threaded hole in a graphite panel.

FIG. 2 is a sectional view of the prior art attempt of FIG. 1, taken at a line 2—2 thereof.

FIGS. 3–7 are sectional views of a graphite panel, illustrating the sequence of operations in repairing a hole with a damaged thread.

FIG. 8 is a sectional view of a graphite panel in which a threaded hole has been formed into a damaged portion of the panel.

DESCRIPTION OF THE PREFERRED EMBODIMENTS

Referring now to the drawings, and in particular to FIGS. 3–7, FIG. 3 shows a graphite panel 10 having a hole 11 drilled thereinto and threaded by a conventional tap to form a thread 12 of a given desired diameter, shape and pitch.

As mentioned previously, the panel would be assembled and held in place by a bolt (not shown) threaded into hole 11. Also as mentioned above, often times the thread 12 is sufficiently damaged upon disassembly of the panels so that it cannot be reused.

The damaged thread is repaired in accordance with the present invention as follows. First, the original hole 11 is drilled or reamed out to remove all of the original thread 12, thus leaving a hole 13 of a larger diameter (FIG. 4). For example, the damaged hole should be drilled out to 1/16 inch oversize (i.e., a hole with a ¼ inch×20 thread would be drilled out to a diameter of 5/16 inch), and if possible, the hole 13 should be drilled to 1/6 inch deeper depth than the bolt 14 will be set in FIG. 6.

Next, the hole 13 is partially filled with a thermosetting graphite cement 16, FIG. 5. Such cement is preferably, by weight, 10 parts phenolic resin, 25 parts furfuryl alcohol and 45 parts graphite, without any other constituents that might evaporate when the panel is subsequently used in a vacuum environment. Also preferably, the graphite cement should be obtained ready mixed so that uniform results will be had from batch to batch in the repair of a plurality of holes. Suitable results have been obtained by use of a graphite cement of the above proportions available from Dylon Industries, Inc., Berea, Ohio.

Referring now to FIG. 6, the bolt 14 is then inserted into hole 13, causing some of the graphite cement 16 to overflow from the hole. Bolt 14 has a thread 17 which has the desired diameter, shape and pitch of the bolt that will subsequently be used in reassembly of the panel 10. Prior to insertion, the thread 17 of the bolt is coated with a very slick lubricant that will provide lubrication of the thread but will not have any contaminants that would adversely affect the graphite cement 16. Preferably, the lubricant is sprayed on, and let dry, to form a thin, dry film on the thread 17 without filling in any of the thread. An aerosol solution containing molybdenum disulfide will provide the desired lubrication. Suitable results have been obtained by use of an aerosol with 4% molybdenum disulfide available from Dow Corning Corporation, Midland, Mich.

Again referring to FIG. 6, a druggist's spatula 18 or similar tool is used to force the overflowed graphite cement 16 back into hole 13 with enough force so that the cement will completely fill the hole and the thread 17 of bolt 14.

Next, the panel 10, with the bolt 14 in place, is heated to harden and cure the graphite cement 16. The curing is performed from about 150°-200° F. for a period of 4-10 hours, and preferably, at 180° F. for 6-8 hours, to provide the required strength in the threaded hole. The temperature should be lower and the time should be longer than that used in normal curing of the cement to compensate for the presence of the bolt 14 in the cement.

After curing, the panel 10 is allowed to cool to room temperature. The bolt 14 is now rotated to unscrew it from the cement 16, leaving a thin layer 19 of cured graphite cement 16 that is firmly bonded to the graphite panel 10 and with a thread 20 of the desired diameter, shape and pitch. The lubricant on bolt 14 will allow removal of the bolt without any damage to the new thread 20.

It has been found that the thread 20 formed as above is at least as strong as the original drilled and tapped hole 11 in the virgin graphite panel.

FIG. 8 illustrates a graphite panel 10 in which a relatively large chunk of the panel was broken away during disassembly, leaving a cavity 22 in the face of the panel. Repair is made as above, with the graphite cement 16 filling the entire cavity and being bonded to the panel 10 during curing. The new thread 20 will again be at least as strong as that of the original drilled and tapped hole.

The foregoing description of the preferred embodiment has been presented for purposes of illustration and description. It is not intended to be exhaustive or to limit the invention to the precise forms described, and obviously many other modifications are possible in light of the above teaching. The embodiment was chosen in order to explain most clearly the principles of the invention and its practical applications, thereby to enable others in the art to utilize most effectively the invention in various other embodiments and with various other modifications as may be suited to the particular use contemplated. It is intended that the scope of the invention be defined by the claims appended hereto.

It is claimed:

1. A method for repairing a damaged threaded hole in a graphite panel, the method comprising:
    forming an enlarged hole by drilling or reaming out the damaged threaded hole in the graphite panel, with said enlarged hole having a diameter larger than a predetermined thread diameter;
    inserting a bolt into said enlarged hole, said bolt being externally lubricated and having said predetermined thread diameter;
    filling a graphite cement into said enlarged hole;
    heating said graphite panel and said graphite cement with said bolt in place in said enlarged hole to a first predetermined temperature for curing the graphite cement;
    cooling said graphite panel and said graphite cement to a second predetermined temperature; and
    removing said bolt from said graphite cement after said graphite cement has cured leaving a thin layer of cured graphite cement firmly bonded to said graphite panel in said enlarged hole in the graphite panel,
    whereby the method produces in said thin layer of cured graphite cement a new thread having substantially the same thread strength and thermal characteristics of the damaged threaded hole before being damaged and which does not adversely affect a vacuum environment of use of said graphite panel.

2. The method as set forth in claim 1, wherein said step of filling said graphite cement into said enlarged hole includes placing enough cement into said enlarged hole prior to insertion of said bolt into said enlarged hole so that inserting said bolt into said enlarged hole causes some of said cement to overflow from said enlarged hole, and tamping the overflow cement back into said enlarged hole with sufficient pressure to cause said cement to completely fill the thread of said bolt.

3. The method as set forth in claim 2, wherein said bolt is externally lubricated by depositing a thin film of a molybdenum compound on said bolt.

4. The method according to claim 1, wherein said step of filling a graphite cement includes using graphite cement which is, by weight, 10 parts phenolic resin, 25 parts furfuryl alcohol and 45 parts graphite, without any other constituents that evaporate when said graphite panel is used in said vacuum environment.

* * * * *